United States Patent [19]

Neumaier

[11] Patent Number: 4,626,146

[45] Date of Patent: Dec. 2, 1986

[54] TOOL HOLDER FOR A DRILLING OR A CHISELING DEVICE

[75] Inventor: Anton Neumaier, Fürstenfeldbruck, Fed. Rep. of Germany

[73] Assignee: Hilti Aktiengesellschaft, Liechtenstein

[21] Appl. No.: 723,666

[22] Filed: Apr. 16, 1985

[30] Foreign Application Priority Data

Apr. 16, 1984 [DE] Fed. Rep. of Germany ....... 3414300

[51] Int. Cl.[4] .............................................. B23B 31/10

[52] U.S. Cl. ............................... 408/239 R; 279/1 B; 279/19.6; 279/81; 279/82

[58] Field of Search ................. 279/81, 82, 1 B, 1 TS, 279/1 E, 30, 49, 50, 56, 57, 71, 75, 76, 103, 87, 19.3, 19.5, 19.6, 19.7; 408/239 R, 239 A; 409/234

[56] References Cited

U.S. PATENT DOCUMENTS

| | | | |
|---|---|---|---|
| 3,536,335 | 10/1970 | Schmuck | 279/81 |
| 3,708,178 | 1/1973 | Lauricella | 279/81 |
| 3,747,946 | 7/1973 | Edens | 279/81 |
| 4,231,581 | 11/1980 | Benedict | 279/81 X |
| 4,491,444 | 1/1985 | Rumpp et al. | 279/19.6 X |

FOREIGN PATENT DOCUMENTS

| | | | |
|---|---|---|---|
| 1194103 | 6/1970 | United Kingdom | 279/81 |

*Primary Examiner*—Gil Weidenfeld
*Assistant Examiner*—Glenn L. Webb
*Attorney, Agent, or Firm*—Toren, McGeady, Stanger, Goldberg & Kiel

[57] ABSTRACT

A tool holder for securing a drilling or chiseling tool in a device includes a guide tube for receiving the cylindrically shaped shank of the tool. An adjusting sleeve laterally encloses the guide tube and the sleeve is axially and rotatably displaceable relative to the guide tube. When the adjusting sleeve is axially displaced a cam projecting from one of the adjusting sleeves and the guide tube contacts a cam surface on the other for effecting the rotational displacement. The cam surface is inclined relative to the axial direction of the guide tube. Openings extend through the guide tube between its inner and outer surfaces and recesses in the inside surface of the sleeve register with the openings when the sleeve is rotatably displaced. Locking elements are radially displaceably mounted in the openings in the guide tube and secure the tool shank in the holder. These locking elements can move radially outwardly into the recesses in the adjusting sleeve when the sleeve is rotatably displaced for releasing the tool shank from the holder.

6 Claims, 4 Drawing Figures

TOOL HOLDER FOR A DRILLING OR A CHISELING DEVICE

BACKGROUND OF THE INVENTION

The present invention is directed to a tool holder for a drilling device or a chiseling device and includes a guide tube for receiving a drilling or chiseling tool and the tool has a cylindrically shaped shank end which is inserted into the guide tube. The shank end has at least one axially closed depression or recess for receiving a locking element. Radially displaceable locking elements are arranged in openings extending radially through the guide tube so that the elements can engage in the recesses in the tool shank. An adjusting sleeve laterally encloses the guide tube and is rotatable relative to the tube and includes recesses which can be placed in registration with the openings through the guide tube.

In addition to devices which are used only for drilling or chiseling operations, percussion drilling devices and hammer drills are known in which the tool inserted into the device experiences a rotational movement and a percussive movement, particularly for work in rock. While it is possible in percussion drilling machines to use drill chucks which are adjustable in diameter and clamped in a friction-locking manner because of the relatively low output, tools with a selected unit diameter for the shank end so that locking elements can engage with the tool in a form-locking manner are conventional in hammer drills and chiseling devices. The locking elements hold the tools so that axial movement is possible while transmitting rotational movement to the tool.

A known tool holder includes an adjusting sleeve which is rotatable relative to the guide tube and has recesses arranged to line up with the locking elements. To replace a tool, the adjusting sleeve is brought into a position where the locking elements can move partially radially outwardly into the recesses. Accordingly, a partial rotation of the adjusting sleeve is required in the known tool holder.

In practice, this known type of tool holder has proved to be disadvantageous. To turn the adjusting sleeve a corresponding countertorque must be applied to the drilling or chiseling device. As a result, the person operating the tool must use both hands to effect the rotation of the adjusting sleeve. Therefore, in such an operation the operator must temporarily let go of the device with one hand to pull the used tool out and replace it with a new one. After inserting the new tool, the adjusting sleeve must be rotated back into the locked position of the tool. Such steps are involved and time-consuming. For handling ease, as well as saving time, it is conventional in practice to rotate the adjusting sleeve into its released position with the tool holder directed downwardly, whereby the tool can drop out of the tool holder due to its own weight. If the tool is allowed to drop, however, it can lead to damage to the tool or injury to the operator.

In another known tool holder the adjusting sleeve is axially displaceable against a restoring force. In this type the tool holder is usually unlocked by pulling the adjusting sleeve in the axial direction. To apply the corresponding reaction force, the device must be supported on the body of the operator or on a support base. The operator's other hand can remain free for replacing the tool. When cylindrical locking elements are used in this type of tool holder, the tool holder usually results in a considerably longer length than that of the above type. Moreover, vibrations developed during the operation of the device can impair the functioning of the tool holder.

SUMMARY OF THE INVENTION

Therefore, the primary object of the present invention is to provide a tool holder which is easy to operate and is reliable.

In accordance with the present invention, the adjusting sleeve is axially displaceable relative to the guide tube and, when it is axially displaced, it is rotated into a position where the recesses in its inside surface register with the openings through the guide tube. The rotational displacement of the adjusting sleeve is effected by the contacting engagement of a radially projecting cam and a cam surface inclined relative to the axial direction of the guide tube.

In such a device, according to the invention, the adjusting sleeve is axially displaced for releasing a tool held in the tool holder. During axial displacement, however, the asjusting sleeve is also rotated relative to the guide tube due to the interaction of the projecting cam and the cam surface. During the rotation of the adjusting sleeve the recesses in its inside surface are moved into register with the openings in the guide tube so that the locking elements in the openings can move radially outwardly into the recesses. It is possible, however, to place the adjusting sleeve in the unlocked position by merely rotating it, if desired.

Another advantage of the present invention, particularly when cylindrically shaped locking elements are used, is that a smaller axially extending actuating path is afforded which provides a more compact arrangement of the device.

There are many possibilities for the arrangement and construction of the control projecting cam and the cam surface. In a simple arrangement it is advisable to locate the cam surface in a groove on the outside of the guide tube and to provide the control projection as a cam extending radially into the groove. Since no large forces or stroke need to be transmitted via the cam or the groove, the groove can be dimensioned so that it is relatively small. This means that there is no substantial reduction in the cross-section of the adjusting sleeve or in the guide tube.

The groove containing the cam surface can be arranged in a number of different ways. For example, an approximately triangular groove is possible which permits both axial and rotational displacement of the adjusting sleeve, as well as only rotation of the sleeve. Another advantageous embodiment involves forming the groove with the width corresponding substantially to the width or diameter of the projecting cam. Such an arrangement of the groove involves a so-called compulsory control, that is, an axial displacement of the adjusting sleeve is automatically converted into the rotation of the sleeve. For ease and operation, however, there should be a certain amount of play between the projecting cam and the surface of the groove.

To avoid the axial displacement of the adjusting sleeve, a catch element can be provided. In such an arrangement, there is the possibility that the device can be operated when the tool is not locked. Such a problem can be prevented by using a restoring spring driving the adjusting sleeve into an initial position where the locking elements are held in the locking position. Due to the restoring spring, the adjusting sleeve is automatically returned into its initial position after it is released. Preferably, the restoring spring is a compression spring which, at the same time, acts as a torsion spring due to the construction of its end coils. Such a construction of the restoring spring is particularly advantageous when there is no compulsory control effected by the projecting cam and the surface of the groove. The restoring force of the spring is dimensioned in such a way that during vibrations a loosening of the adjusting sleeve is prevented and, at the same time, the amount of force required to loosen the adjusting sleeve is not too great.

For the axial displacement of the adjusting sleeve relative to the guide tube, it is necessary that the locking elements be axially displaceable relative to the adjusting sleeve or to the guide tube. If the locking elements are to be axially displaceable relative to the adjusting sleeve, the recesses in the adjusting sleeve must be longer than the locking elements. Since the recesses are formed on the inside surface of the adjusting sleeve, this feature involves considerable extra cost in terms of production, particularly in the machining of the adjusting sleeve. For a simple production operation, it is advantageous to design the axial length of the openings through the guide tube so that the length is greater than the axial length of the locking elements at least by the extent of the axial displacement path of the adjusting sleeve. The additional processing of the guide tube to provide such an arrangement is relatively small.

To insert a tool into the tool holder, the adjusting sleeve must be moved into the position permitting the radially outward displacement of the locking elements. One of the operator's hands is required for this manipulation, while the other hand is used to replace the tool. Such an operation is relatively involved. Moreover, the device incorporating the tool holder must be supported on the operator's body or on a support base. As a solution, the locking elements project from the outer contour of the guide tube in the locked position and the adjusting sleeve has a stop shoulder for contact with the locking elements projecting outwardly from the guide tube. In this arrangement, when inserting the tool shank into the guide tube, the adjusting sleeve can be pushed back axially over the locking elements which are supported by the end of the shank and also by the stop shoulder. Since only one hand is needed for this operation, the other hand remains free and can be used to hold the device. When the adjusting sleeve reaches its rear end position in axial displacement, the locking elements can move radially outwardly into the recesses in the inside surface of the adjusting sleeve and the shank can push past the locking elements. As soon as the recesses in the shank enter the region of the openings in the guide tube, the locking elements move into the recesses and connect the tool with the tool holder in a form-locking manner. Under certain circumstances, it is necessary, to partially rotate the tool relative to the guide tube to effect the seating of the locking elements.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 2:
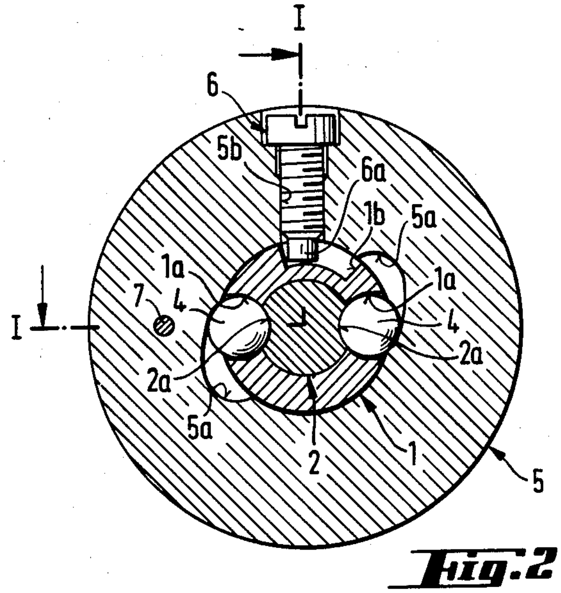
FIG. 2 is a transverse cross-sectional view through the tool holder shown in FIG. 1 and taken along the line II—II.
Figure 1:
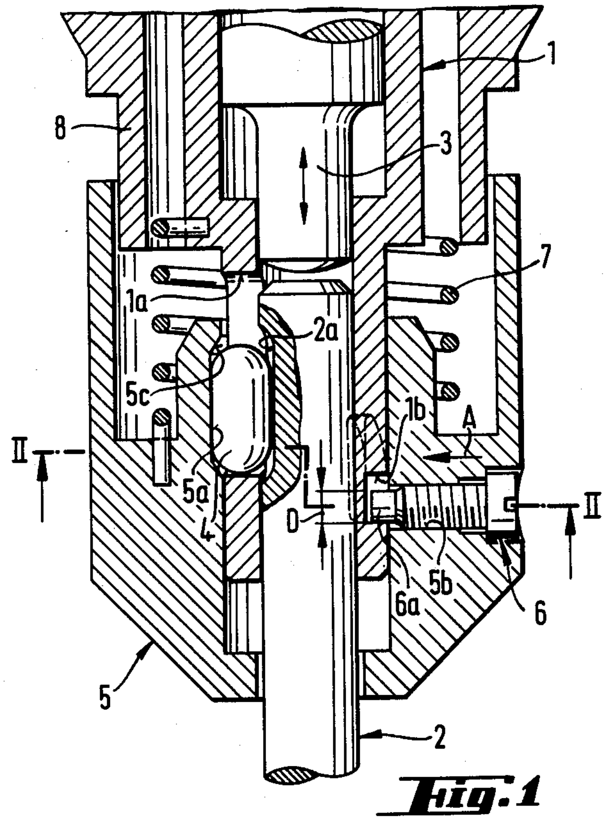
FIG. 1 is an axially extending sectional view of a tool holder embodying the present invention and taken along the line I—I in FIG. 2.

A tool holder is illustrated in FIGS. 1 and 2 and includes an axially extending guide tube 1 with two diametrically opposed openings **1*a* adjacent its front end, that is, the lower end as viewed in FIG. 1. The openings 1*a* extend radially through the guide tube between its inside and outside surfaces. The shank end 2 of a tool to be clamped in the tool holder is guided within the axially extending passage extending from the front end of the guide tube 1. The shank 2 is provided with two diametrically opposite axially extending recesses 2*a*. Within the guide tube 1 in the upper portion of FIG. 1 an anvil 3 is supported so that it is axially displaceable within the upper or rear portion of the guide tube. The anvil 3 contacts the end of the shank inserted into the guide tube and transmits percussion from a percussion mechanism, not shown, to the shank 2. A cylindrically shaped locking element 4 is located in each of the openings 1*a*. The locking elements 4 seat within the recesses 2*a* in the shank 2 in a form-locking manner. Note that the axial length of the locking elements is less than the axial length of the recesses 2*a* so that axial movement of the shank 2 relative to the locking elements is possible. An axially displaceable adjusting sleeve 5 extends laterally around the guide tube 1** and extends forwardly of the front or lower end of the guide tube.

As illustrated specifically in FIG. 2, the adjusting sleeve 5 has a pair of diametrically opposite grooves or recesses **5*a*. In addition, a groove 1*b* is provided in the outside surface of the guide tube 1 as can be viewed in FIG. 2. The adjusting sleeve 5 has a threaded borehole 5*b* extending transversely of the axial direction of the guide tube 1. A screw 6 is threaded into the borehole 5*b*. At its radially inner end, the screw 6 has a cylindrically shaped cam projection which extends into the groove 1*b* and engages the surfaces forming the groove. The adjusting sleeve 5 is held in the locking position as illustrated in FIG. 1, by a restoring spring 7**.

Figure 3:
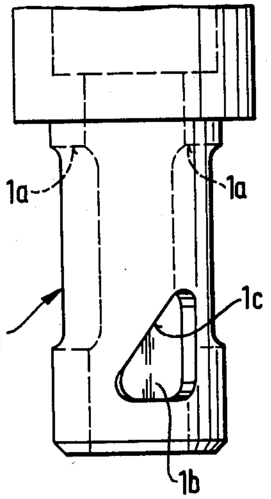
FIG. 3 is an elevational view of the guide tube in the tool holder illustrated in FIG. 1 viewed in the direction of the arrow A in FIG. 1.

The substantially triangular shape of the groove **1*b* extending into but not through the wall of the guide tube can be seen in FIG. 3. The groove 1*b* has a cam surface 1*c*** inclined obliquely relative to the axis of the guide tube.

If the adjusting sleeve shown on the tool holder in FIG. 1 is pushed rearwardly, that is, upwardly, against the shoulder formed by the housing part 8, the radially inwardly projecting cam **6*a* contacts the cam surface 1*c* and results in a relative rotation of the adjusting sleeve 5 with respect to the guide tube 1** causing the sleeve to rotate in the clockwise direction as viewed relative to the tool. During such rotational movement, the recesses 5a in the adjusting sleeve moves into registration with the openings 1a in the guide tube 1 so that the locking elements 4 can be displaced radially outwardly for releasing the shank 2 of the tool. If the adjusting sleeve 5 is released, it is automatically returned to the initial position shown in FIGS. 1 and 2 by the restoring spring 7. In the construction of the groove 1b shown in FIG. 3, the restoring spring 7 is preferably formed as a combined compression and torsion spring. Accordingly, the adjusting sleeve during its return movement moves back into the locking position. In the arrangement of the groove 1b illustrated in FIG. 3, it is possible to unlock the tool holder merely by rotating the adjusting sleeve 5 without displacing it axially along the housing part 8.

Figure 4:
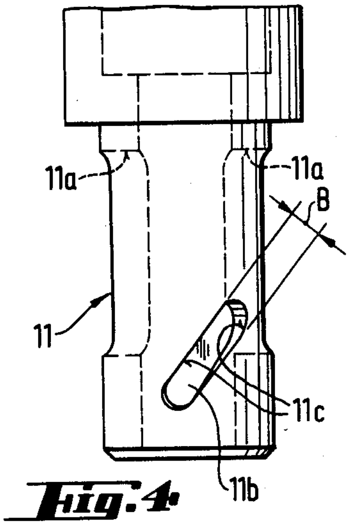
FIG. 4 is a view similar to FIG. 3 displaying another embodiment of the guide tube.

Another embodiment of the guide tube 11 is displayed in FIG. 4 and the tube has a groove 11b with a different shape from the groove 1b shown in FIG. 3. Groove 11b has a width B which is the same along its entire length and corresponds substantially to the width or diameter D of the protecting cam 6a on the inner end of the screw 6. In this arrangement, cam surfaces 11c are formed by the long sides of the groove 11b. In contrast to the arrangement of the groove 1b shown in FIG. 3, in FIG. 4 a compulsory control or guidance takes place, that is, the axial displacement of the adjusting sleeve 5 is automatically translated into a relative rotation of the adjusting sleeve with respect to the guide tube 11. In this second embodiment, the restoring spring can be a pure compression spring. The guide tube 11 is provided with two diametrically opposed recesses 11a for the locking elements 4.

In the arrangement displayed in FIGS. 1 and 2, the locking elements 4 project outwardly beyond the outside surface of the guide tube 1 in the locked position. The adjusting sleeve 5 has a stop shoulder 5c for the region of the locking elements 4 projecting outwardly from the outside surface of the guide tube 1. This arrangement makes it possible to insert the shank 2 of the tool into the tool holder without initially pulling the adjusting sleeve 5 backwardly. During the insertion of the tool shank, the adjusting sleeve is pushed back due to the engagement of the locking elements 4 with the end of the shank 2 and the stop shoulders 5c on the adjusting sleeve which then moves rearwardly relative to the guide tube. As soon as the recesses 5a are rotated into the region of the openings 1a, the locking elements 4 can move radially outwardly and permit the shank to enter fully into the guide tube. If the locking elements 4 then return radially inwardly into the depressions or recesses 2a in the shank 2, the adjusting sleeve is returned into the initial position set forth in FIG. 1 by the restoring spring 7 and the tool is locked within the tool holder. Accordingly, the operator requires only one hand for inserting a tool into the tool holder.

While specific embodiments of the invention have been shown and described in detail to illustrate the application of the inventive principles, it will be understood that the invention may be embodied otherwise without departing from such principles.

I claim:

1. A tool holder for drilling and chiseling devices comprising an axially elongated guide tube arranged to receive a tool with a cylindrically shaped shank end with axially extending depressions in the cylindrical shank end, said guide tube having openings extending therethrough from the radially outer surface to the radially inner surface, said guide tube having a first end arranged to receive the shank end of the tool, locking elements positioned within said openings and being radially displaceable therein for engaging within the depressions in the tool shank, an adjusting sleeve laterally enclosing said guide tube and said sleeve being rotatable relative to said guide tube, and recesses formed in the inside surface of said sleeve arranged to register with said openings in said guide tube, wherein the improvement comprises that said adjusting sleeve has a first end and a second end spaced apart in the axial direction of said guide tube and the first end of said adjusting sleeve being spaced axially from the first end of said guide tube, said adjusting sleeve is manually axially displaceable relative to said guide tube, and means for rotating said adjusting sleeve relative to said guide tube when said adjusting sleeve is manually axially displaced relative to said guide tube for effecting registration of said recesses in said adjusting sleeve with said openings in said guide tube, said means comprising a cam surface on one of said adjusting sleeve and guide tube with the cam surface extending generally in the axial direction of said guide tube and inclined at an oblique angle relative to the axis of said guide tube and a projecting cam in the other one of said adjusting sleeve and guide tube and extending therefrom into surface contact with said surface, and said means comprising a cam surface being spaced axially from the first end of said guide tube and between the first and second ends of said adjusting sleeve.

2. A tool holder, as set forth in claim 1, wherein a groove is formed in the outside surface of said guide tube with a portion of said groove forming said cam surface, and said projecting cam comprises a radially extending member mounted in said adjusting sleeve and extending into surface contact with said cam surface in said groove in said guide tube.

3. A tool holder, as set forth in claim 2, wherein said groove is elongated and has a width extending transversely of the elongated direction corresponding substantially to the diameter of said projecting cam so that said projecting cam is displaceable through the elongated direction of said groove.

4. A tool holder, as set forth in claim 1, 2 or 3, wherein said adjusting sleeve has an initial position where said locking elements are in locked engagement with the tool shank inserted into said guide tube and a final position spaced in the axial direction of said guide tube from the initial position where said locking elements are disengaged from the tool shank, and a restoring spring mounted in contact with said adjusting sleeve for biasing said adjusting sleeve into the initial position.

5. A tool holder, as set forth in claim 1, 2 or 3, wherein said openings in said guide tube have a dimension extending the axial direction thereof greater than the corresponding dimension of said locking elements extending in the axial direction of said guide tube, and the length of said openings exceeding the length of said locking elements by an amount at least equal to the axial displacement of said adjusting sleeve.

6. A tool holder, as set forth in claim 5, wherein said locking elements when engageable within the depressions in the shank of the tool extend radially outwardly from the outside surface of said guide tube, and said adjusting sleeve has a stop shoulder therein in the path of at least one of said locking elements so that said locking elements contacts said stop shoulder when the shank of a tool is inserted into said guide tube so that said locking element in contact with said stop shoulder effects the axial displacement of said adjusting sleeve relative to said guide tube.

* * * * *